United States Patent Office 3,497,273
Patented Feb. 24, 1970

3,497,273
HYDRODYNAMIC BEARING FOR AXIAL AND RADIAL LOADS
Everhardus Albertus Muijderman and Gerrit Remmers, Emmasingel, Eindhoven, Netherlands, assignors, by mesne assignments, to U.S. Philips Corporation, New York, N.Y., a corporation of Delaware
Filed Mar. 5, 1968, Ser. No. 710,547
Claims priority, application Netherlands, Mar. 31, 1967, 6704587
Int. Cl. F16c *17/16, 1/24, 17/10*
U.S. Cl. 308—9          5 Claims

ABSTRACT OF THE DISCLOSURE

A hydrodynamic bearing for supporting radial and axial loads. A stub shaft having a flange portion is seated within a pressure chamber formed in a bearing housing. A groove pattern is provided for cooperation between the flange and the chamber surface to permit axial self-adjustment of the bearing.

---

Figure 1:
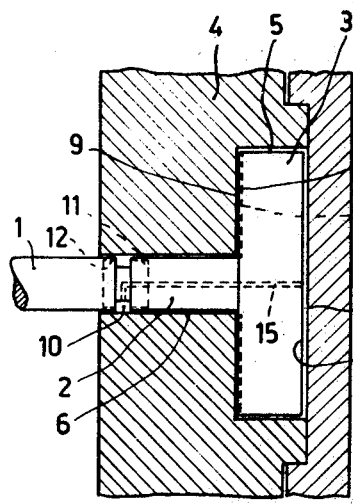

The invention relates to a hydrodynamic bearing for axial and radial loads which comprises a stub shaft, a flange joined thereto and a bearing housing. One of the two co-operating surfaces of the flange and the bearing housing is provided with a pattern of shallow grooves. Rotation of the stub shaft and the flange relative to the bearing housing, produces a pressure build-up of the lubricant.

In previously known bearings having supporting axial forces acting in a given direction, an accurate axial adjustment of the shaft could be obtained only if the shaft was continuously subjected to a sufficiently large force which pressed the axial supporting surface of the flange towards the axial supporting surface of the bearing housing. If this force is insufficient the shaft has to be pre-stressed, for example, by means of a resilient or magnetic member.

An object of the invention is to provide a bearing of simple construction and which does not require additional members for obtaining a desired axial adjustment. According to the invention, the bearing housing has a space for receiving the flange which substantially corresponds to the shape of the flange and which communicates with the outer side of the bearing through a bore which receives the stub shaft. The pattern of grooves is provided on the surface of the flange or surface of the space facing the bore. The shaft or the bore is provided with shallow transport grooves which, upon rotation of the shaft, urge lubricant toward the flange.

The transport grooves urge the lubricant to the space receiving the flange so that this space is completely filled with lubricant the pressure of which may assume a considerable value. The co-operating supporting surfaces of the shaft and of the bore constitute a hydrodynamic bearing for absorbing radial loads. Since the pressure in the lubricant acts upon the whole flange and since the surface of the flange on the side remote from the shaft is larger than that on the side facing the shaft, the flange will be automatically subjected to a pre-stress which presses the flange toward the co-operating surface of the space lying in the proximity of the bore. Thus, pre-stressing means can be completely dispensed with. The surface of the flange or of the space provided with grooves together with the corresponding surface acts as a spiral groove bearing, which, as is known, has a high load-carrying capacity and a low frictional loss. The force absorbed by this spiral groove bearing is equal to the sum of the resultant force exerted on the flange by the static pressure in the lubricant and the axial load of the shaft. In accordance with the value of the axial load, the bearing gap between the flange and the space will have a width, for example, between 10 and $25/\mu$. Thus, in the construction according to the invention, the axial displacement of the flange and hence of the shaft is extremely small.

An accurate axial adjustment of the shaft can be obtained if the two axial surfaces of the flange accurately fit between axial surfaces of the bearing housing. If the shaft is substantially and continuously loaded in a given axial direction, this arrangement is not particularly suitable because of the high manufacturing costs and the generally comparatively large frictional losses in the lubricant. In contradistinction to this construction in an embodiment of the invention, the flange is disposed in a space in the bearing housing, having a clearance of at least 0.1 mm. Due to the pressure of the lubricant in the space, the flange is continuously subjected to a pre-stress force which presses the axial supporting surface of the flange toward the axial supporting surface of the space. The clearance between the flange and the space does not adversely affect the operation of the bearing. From a manufacturing viewpoint, this construction is economical and the frictional losses in the lubricant are low.

In one embodiment of the bearing, in which grease is used as the lubricant, the shaft has an annular chamber which serves as supply chamber for the grease and is bounded by the wall of the bore, the transport grooves join the side of the supply chamber facing the flange and a groove pattern acting as a seal for the grease is provided on the other side of the supply chamber in the shaft or in the bore. A sufficient quantity of grease will therefore always be available so that re-lubrication is not necessary.

A high static pressure may be produced in the space receiving the flange if the transport grooves are overly effective. The pre-stress to which the flange is subjected due to this static pressure would then be high and would impose high requirements on the spiral groove bearing which is formed in the surfaces of the flange and the space facing the shaft. In order to reduce their transporting effectiveness, the transport grooves may be provided with deeper grooves or their effective length on the shaft may be shortened. In another solution, according to a further embodiment of the invention, the space for receiving the flange has a narrow duct communicating on the side remote from the shaft with an area where a lower pressure prevails during operation of the bearing. Due to the pressure release provided by the duct, the static pressure in the space decreases, without adversely affecting the operation of the bearing. The duct may be provided in either or both the stationary and rotatable bearing member. When the lubricant used is grease, the duct preferably leads, through the shaft to the grease supply chamber.

Alternatively, the bearing may be adapted to axially absorb forces in two opposite directions. This may be advantageous, for example, if the shaft is subjected to an axial load which constantly varies in direction. For this purpose, one of the two surfaces of the flange or of the space remote from the shaft is also provided with a shallow groove pattern which produce in co-operation with the other surface a pressure build-up effect in the lubricant. This embodiment requires an accurate fit between the flange and bearing surfaces and is therefore more difficult to manufacture. However, this bearing acts in two opposite directions and, because the grooves of the two patterns may be of helical form, the load-carrying capacity is very high and the frictional loss is low for both axial loads.

The invention will be described with reference to embodiments shown in the drawing.

Figure 2:
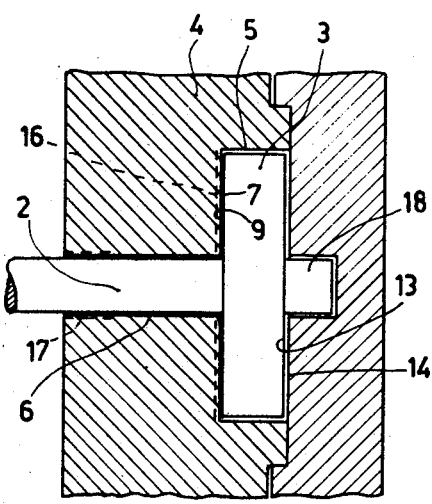
Figure 3:
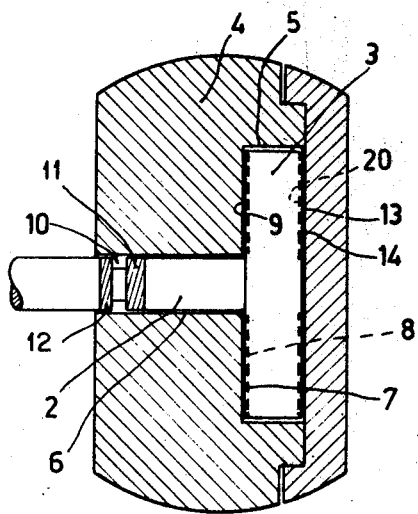
Figure 4:
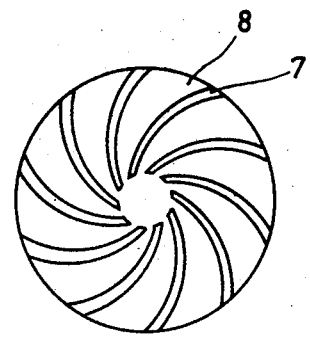

In the drawing:

FIGURE 1 shows a bearing according to the invention suitable for grease-lubrication, FIGURE 2 shows an alternative embodiment of this bearing, FIGURE 3 shows an embodiment of the bearing having two axial supporting surfaces acting in opposite directions, and FIGURE 4 shows a possible embodiment of the groove pattern used in the axial bearing.

In the bearing of FIGURE 1, which is particularly suitable for grease-lubrication, a flange 3 is joined to a stub shaft 2 of a shaft 1. The flange 3 is received by a space or pressure chamber 5 in a bearing housing 4 which substantially corresponds to the shape of the flange. The stub shaft 2 fits in a bore 6 of the bearing housing. The surface 7 of the flange is provided with a groove pattern. 8. The depth of the grooves is small; in proportion to the dimension of the bearing, the depth can be, for example, between 5 and $50\mu$. These grooves preferably have the form of logarithmic spirals and this term also includes the fishbone-shaped spirals. Alternatively, the grooves may have a form approximately logarithmic spirals, though their effect is then slightly decreased. FIGURE 4 shows the preferred shape of the spiral grooves. The surface 7 provided with grooves 8 together with the surface 9 of the space 5 in the bearing housing forms a spiral groove bearing, which when compared with other hydrodynamic bearings has a high load-carrying capacity and a low frictional loss. In the stub shaft 2 an annular chamber 10 is provided which is filled with grease. This grease supply chamber is bounded by the wall of the bore 6. The stub shaft is provided with a pattern of shallow helical grooves 11 which join the grease supply chamber 10 and extend towards the flange 3, which grooves try to urge grease from the supply chamber 10 towards the flange upon rotation of the stub shaft 2 relative to the bearing housing 4. The other side of the chamber 10 is provided with a pattern or shallow helical grooves 12 which constitute with the wall of the bore a seal for the grease. The grooves 11 and 12 preferably have a multiple-threaded, for example a quadruple-threaded pitch.

The bearing, which will be filled for the major part with grease, becomes operative by rotation of the shaft 1 relative to the bearing housing 4, the grease in the supply chamber 10 will be urged towards the bore due to the centrifugal force. The sealing grooves 12 prevent grease from leaking out. The grease in the supply chamber contacts with the ends of the transport grooves 11 which urge it towards the flange until the space 5 is completely filled with grease under pressure. The gap between the part of the stub shaft 2 not provided with grooves and the bore 6 consequently always contains grease; this part acts as a hydrodynamic radial bearing. The surface 7 of the flange provided with grooves 8 acts together with the surface 9 of the space 5 as an axial spiral groove bearing.

Due to the effect of the transport grooves, the space 5 is completely filled with grease under pressure. Since the surface 13 of the flange remote from the stub shaft is larger than the surface 7 facing the stub shaft, the pressure of the grease results in a force being exerted on the flange which presses the surface 7 towards the surface 9. Provided that an axial force exerted on the shaft does not exceed the pre-stress to which the flange is subjected and that this force is not directed towards the flange, the two surfaces 7 and 9 invariably constitute the axial bearing. The distance from the surface 13 of the flange to the surface 14 of the space may thus be chosen arbitrarily; the axial adjustment of the flange and hence of the shaft is all the same invariably determined by the surfaces 7 and 9. In this bearing, the said distance between the surfaces 3 and 14 is preferably larger than 0.1 mm. The tolerance requirements are advantageously low, which is favourable from a manufacturing point of view. Furthermore, the frictional loss in the grease is extremely low. The spiral groove bearing constituted by the surface 7 provided with grooves and the surface 9 absorbs a force which is equal to the resultant of the pre-stress to which the flange is subjected and an axially directed force which may be exerted on the shaft. In accordance with the value of the latter force, the size of the bearing gap is not too large; a spiral groove bearing can be, for example, between 10 and $25\mu$. This means that, when its axial load is varied, the shaft is axially displaced only over a distance of a few microns, whcih is a desirable advantage of this bearing.

Due to the effect of the transport grooves 11, a high pressure may be produced in the pressure chamber 5 and the spiral groove bearing formed in the surfaces 7 and 9 will be extremely heavily loaded. This will be the case when a large axial force is exerted on the shaft and directed away from the flange. In order to reduced the high pressure of the grease in the space 5, the length or depth of the transport grooves could be varied. However, the pressure in the space 5 can also be reduced in a very simple manner by having this space communicate through a narrow duct with an area where a lower pressure prevails. For this purpose, the bearing shown in FIGURE 1 is provided with a duct 15 leading from the space 5 to the grease supply chamber 10. This bearing, has the added advantage that no grease will escape from the bearing and therefore re-lubrication is not necessary. It should be appreciated that the duct 15 will be operative only if the load of the axial bearing 7, 8, 9 is particularly heavy.

The use of grease as a lubricant affords the advantage that both when the bearing rotates and when it is stationary, no lubricant is lost so that re-lubrication is not necessary, and the apparatus in which the bearing is incorporated is prevented from being soiled. However, any desired lubricant such as oil, water, air and so on, may be used. Furthermore, the grooves 11, 12, and 8 may be provided in the bearing housing instead of on the stub shaft and on the flange. This does not influence the operation of the bearing.

FIGURE 2 shows an embodiment of an oil-lubricated bearing, in which the transport grooves 17 and the pressure build-up grooves 16 are provided in the bearing housing. Upon rotation of the shaft 2 relative to the bearing housing 4, oil contacting with the shaft 2 is urged by the transport grooves to the space 5 where it is subjected to a pressure. In this embodiment, provision is also made of a trunnion 18 which may be useful for the radial bearing. Since the axial spiral groove bearing constituted by the surface 9 provided with grooves 16 and the surface 7 of the flange is assumed to be not excessively heavily loaded, the duct 15 of FIGURE 1 is omitted in this case. The operation of this bearing is otherwise equal to that of the bearing of FIGURE 1 so that it will not be described further.

According to the invention, the axial bearing may also be adapted to axial loads on the shaft varying in direction and, as the case may be, in magnitude. FIGURE 3 shows an embodiment of such a bearing. This embodiment approximately corresponds to the bearing of FIGURE 1. However, in this case, the surface 13 of the flange is provided with a pattern of grooves 20 which produce a pressure build-up effect in the lubricant. The groove pattern shown in FIGURE 4 may be used in this case. The distance between the surfaces 9 and 14 of the space 5 will now exceed the thickness of the flange only by the amount which is required for the axial lubrication. The duct 15 shown in FIGURE 1 is of course not used in this case. In accordance with the value and the direction of the axial load on the shaft, this load will be absorbed by the surfaces 7 and 9 or by the surfaces 13 and 14 of the flange and the space.

The bearing housing 4 may be integral with a construction in which the bearing is arranged. As an alternative, however, it may be a separate part. It is often advantageous to allow for a certain adjustment of the bearing housing, for example, by giving part of its surface a spherical shape, as shown in FIGURE 3.

If desired, the flange may have a shape different from the cylindrical shape shown in FIGURES 1, 2 and 3; it may be, for example, in the form of a truncated cone. If this is of advantage, a pattern of transport grooves may be provided on the cylindrical or, as the case may be, conical surface of the flange in order to increase the static pressure between the surfaces 13 and 14.

What is claimed is:

1. A hydrodynamic bearing for supporting both axial and radial loads comprising a shaft, a cylindrical flange having two flat sides affixed at one of said sides to one end of the shaft, a bearing housing defining therein a bore for accommodating said shaft and a pressure chamber conforming to and accommodating the flange, a first groove pattern formed in one of the surfaces of the shaft or bore for urging a lubricant toward and into said pressure chamber, a second groove pattern formed in one of the surfaces of that side of the flange to which the shaft is affixed or the pressure chamber surface confronting said side, said side presenting a smaller surface area than the corresponding surface on the flange side remote from said shaft such that upon rotation of the shaft with respect to the bearing housing, the flange will be subjected to a pressure differential creating a hydrodynamic force in the direction of the shaft.

2. A hydrodynamic bearing as claimed in claim 1 further comprising an annular chamber formed in said shaft adjacent said first groove pattern for supplying a lubricant to said first groove pattern, and a third groove pattern on said shaft adjacent the side of said annular groove most remote from said flange, said third groove pattern acting as a seal to prevent escape of the lubricant from the bore.

3. A hydrodynamic bearing as claimed in claim 2 wherein the shaft and flange define therein a duct having one aperture in the flange side remote from said shaft and a second aperture in said annular chamber.

4. A hydrodynamic bearing as claimed in claim 3 wherein there is a clearance of at least 0.1 mm. between the flange and the chamber surface within the bearing housing.

5. A hydrodynamic bearing as claimed in claim 2 wherein a fourth groove pattern is formed in one of the surfaces of the flange side remote from said shaft or the confronting surface of the pressure chamber for pressurizing the lubricant.

References Cited
UNITED STATES PATENTS

| | | | |
|---|---|---|---|
| 3,238,000 | 3/1966 | Muijderman et al. | 308—121 |
| 3,207,563 | 9/1965 | Muijderman | 308—172 |
| 1,520,356 | 12/1924 | Lawaczeck | 308—9 |

MARTIN P. SCHWADRON, Primary Examiner

FRANK SUSKO, Assistant Examiner

U.S. Cl. X.R.

308—122, 172

UNITED STATES PATENT OFFICE
CERTIFICATE OF CORRECTION

Patent No. 3497273　　　　　　　　　　Dated Feb. 24, 1970

Inventor(s) EVERHARDUS ALBERTUS MUIJDERMAN ET AL

It is certified that error appears in the above-identified patent and that said Letters Patent are hereby corrected as shown below:

Column 3, line 74, "3" should read --13--

Column 4, line 19, "reduced" should read --reduce--

Signed and Sealed this 14th day of July, 1970.

(SEAL)
Attest:

Edward M. Fletcher, Jr.
Attesting Officer

WILLIAM E. SCHUYLER, JR.
Commissioner of Patents